US008239063B2

(12) United States Patent
Clifford et al.

(10) Patent No.: US 8,239,063 B2
(45) Date of Patent: Aug. 7, 2012

(54) SERVO MOTOR MONITORING AND HOOD/DECK EXCHANGE TO ENHANCE THE INTERIOR COATING PROCESS

(75) Inventors: Scott J. Clifford, Rochester Hills, MI (US); Paul D. Copioli, Sterling Heights, MI (US); Bradley O. Niederquell, Troy, MI (US); Randy Graca, Macomb, MI (US); Yi Sun, West Bloomfield, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 1043 days.

(21) Appl. No.: 12/181,518

(22) Filed: Jul. 29, 2008

(65) Prior Publication Data

US 2010/0030381 A1 Feb. 4, 2010

(51) Int. Cl.
*G06F 19/00* (2011.01)

(52) U.S. Cl. .......... 700/245; 700/256; 700/258; 901/49; 901/23; 901/31; 901/46; 901/2; 118/323

(58) Field of Classification Search .................. 700/258, 700/256, 245; 901/49, 23, 31, 46, 2; 118/323, 118/620, 629, 326, 321; 138/121, 109, 120; 239/690, 690.1, 750–752; 427/427.2, 427.3
See application file for complete search history.

(56) References Cited

U.S. PATENT DOCUMENTS 4,498,414 A 2/1985 Kiba et al.
4,552,506 A 11/1985 Cummins et al.
4,702,666 A * 10/1987 Iwao et al. .................... 414/730
4,988,260 A 1/1991 Kiba et al.
5,653,805 A * 8/1997 Russell et al. ................ 118/503
5,994,864 A * 11/1999 Inoue et al. ................ 318/568.2
6,145,180 A * 11/2000 Kogai et al. ...................... 29/429
6,206,324 B1 * 3/2001 Smith ............................. 244/72
6,375,100 B1 * 4/2002 Tsaii et al. ................. 239/587.1
6,398,871 B1 * 6/2002 Hur ............................... 118/323
6,455,097 B1 * 9/2002 Berclaz et al. ..................... 427/8
6,675,467 B2 * 1/2004 Oatridge et al. ................ 29/771
6,703,079 B2 * 3/2004 Clifford et al. .................... 427/8
6,851,166 B1 * 2/2005 Demit et al. .................. 29/281.5
6,899,377 B2 * 5/2005 Ghuman et al. ........... 296/181.1
6,919,701 B2 * 7/2005 Nagata et al. ............ 318/568.12
6,945,483 B2 * 9/2005 Clifford et al. ............ 239/690.1
7,102,315 B2 * 9/2006 Nakata et al. ............ 318/568.22
7,225,914 B2 * 6/2007 Nakamura et al. ......... 198/465.4
7,395,606 B2 * 7/2008 Crampton ......................... 33/503
7,399,363 B2 * 7/2008 Clifford et al. ............... 118/323
7,405,531 B2 * 7/2008 Khatib et al. ............ 318/568.11
7,469,473 B2 * 12/2008 Savoy .......................... 29/897.2
(Continued)

FOREIGN PATENT DOCUMENTS

JP 63-106189 A 5/1988
(Continued)

*Primary Examiner* — Thomas G. Black
*Assistant Examiner* — Wae Louie
(74) *Attorney, Agent, or Firm* — Fraser Clemens; Martin & Miller LLC; William J. Clemens

(57) ABSTRACT

A method and system for handling a swing metal panel using a robot's drive axis servo motor feedback to eliminate the need for the sensors and breakaway devices is provided. Using the servo motor feedback for this function reduces cost and improves reliability. The method also applies the servo motor feedback to hold a panel in position and exchange the panel between robots during the painting or coating process.

20 Claims, 8 Drawing Sheets

U.S. PATENT DOCUMENTS

| | | | | |
|---|---|---|---|---|
| 7,622,158 | B2 * | 11/2009 | Clifford et al. | 427/427.2 |
| 7,638,000 | B2 * | 12/2009 | Clifford et al. | 118/323 |
| 7,798,094 | B2 * | 9/2010 | Meissner | 118/305 |
| 2004/0115360 | A1 * | 6/2004 | Clifford et al. | 427/421 |
| 2006/0292308 | A1 * | 12/2006 | Clifford et al. | 427/427.2 |
| 2007/0017081 | A1 * | 1/2007 | Becker et al. | 29/429 |
| 2010/0030381 | A1 * | 2/2010 | Clifford et al. | 700/258 |

FOREIGN PATENT DOCUMENTS

| | | | |
|---|---|---|---|
| JP | 6-107252 | A | 4/1994 |
| KR | 2004-0003831 | A | 1/2004 |
| WO | WO 2006/035259 | A1 | 4/2006 |

* cited by examiner

SERVO MOTOR MONITORING AND HOOD/DECK EXCHANGE TO ENHANCE THE INTERIOR COATING PROCESS

FIELD OF THE INVENTION

The present disclosure relates generally to a method and apparatus for detecting and/or holding a panel for use with an industrial robot during a coating operation for vehicle bodies.

BACKGROUND OF THE INVENTION

Industrial robots are in widespread use for automated industrial painting and coating operations. Automation of interior painting or coating is limited by the difficulties experienced in locating a panel, such as a hood/deck or door panel, without damaging the panel. Further difficulties are experienced in holding a panel in position once located.

A newly manufactured automobile body is typically painted with the doors installed. During the coating process, the doors are moved from a closed position to an open position to facilitate the painting of an interior of the automobile body. The doors are returned to the closed position when the painting of the interior of the automobile body is completed. Robotic devices featuring a specially adapted tool disposed at the end of an articulated arm are typically employed to grip the doors during the opening and closing process. The automobile hood and deck can also be installed on the automobile body and must also be opened and closed during the coating process, similar to the doors.

Many automobile manufacturers paint the interior of vehicles on moving line conveyor systems. Engaging the body panels on a moving part requires design consideration for line stoppages. The panels are often kept in the closed position with production aids to keep them from opening during conveyance through the paint shop. Force transducers, breakaway devices or spring loaded complaint switch devices, such as safety clutches, have been used to detect abnormalities in the opening and closing process. These devices are used to prevent damage to the car, robot engagement tooling, and/or the robot itself during the opening, holding and closing process. Sensors are also built into the engagement tooling to detect that the panel is in the proper grasp of the device.

One such method is illustrated in U.S. Pat. No. 4,498,414 to Kiba, et al., issued Feb. 12, 1985, teaches a robot comprising a painting arm equipped with a non-contact door sensor that detects the window groove by measuring reflection time of an ultrasonic wave.

U.S. Pat. No. 4,552,506 to Cummins, et al., issued Nov. 12, 1985, for an OPENER MECHANISM and SYSTEM UTILIZING SAME that teaches an apparatus and method for opening and closing body panels of a vehicle using a mechanical four-bar linkage.

U.S. Pat. No. 4,702,666 to Iwao, et al., issued Oct. 27, 1987, teaches a manually applied door lock device for mounting on a vehicle door that opens the door to a predetermined angle.

U.S. Pat. No. 4,988,260 to Kiba, et al., issued Jan. 29, 1991, teaches an engaging rod fitted to the end of a coating robot arm. The rod is equipped with an optical or ultrasonic sensor mounted near the engaging rod.

U.S. Pat. No. 5,653,805 to Russell, et al. issued Aug. 5, 1987, teaches mechanical means for positioning a body panel during a coating process.

U.S. Pat. No. 6,375,100 to Tsaii, et al., issued Apr. 23, 2002, teaches a positioning device including an attachment structure 60, a rod 62, a flange assembly 64 and an engagement mechanism 66 for engaging a windowsill, for example, within a groove of rotatable flange 120 of the flange assembly 64.

U.S. Pat. No. 6,398,871 to Hur, issued Jun. 4, 2002, teaches a painting robot provided with a door opening/closing jig. This mechanical device eliminates the need for a separate door opening/closing robot.

U.S. Pub. No. 20070017081 to Becker, et al., issued Jan. 25, 2007, teaches a method for precisely aligning an add-on part using sensors.

The use of tooling hooks attached to hoods, hatches and desk lids is also known. For example, JP 6107252A teaches the use of a proximity switch on the ascertaining device 90 located at the end of a finger 16 that is attached to the hand of a vertical articulated robot.

JP 63106189 teaches a coating robot 16 and door on-off robot 20 installed on a traveling device on either side of a conveyor 12. A door on-off controller 36 controls each operation of the travel driver 24 for each robot. The reliability of a door opener is improved by detecting a door position with a door sensor and comparing with a reference closing door position, providing correction to the claw engaging position if necessary.

KR20040003831 teaches a displacement sensor 1 located at one end of a robot 4 for detecting the position accuracy of a fender. A hook shaped hood-opening unit 2 opens the hood to mount a hood assembly to a body 3. A robot SLC 5 inputs a position value of the fender and a fender fixing device fixes the fender panel to mount the pane to the body. A servo motor moves the fender mounting jig to a pre-determined position based on the position value.

WO 2006/035259 teaches combining a non-contact door sensor with force sensors for detecting forces on the door opening robot.

There is a continuing need for a system and method for automated interior painting or coating that eliminates the need for the sensors and breakaway devices. Desirably, the system and method reduces costs and exhibits an improved reliability over known painting systems and methods.

SUMMARY OF THE INVENTION

In concordance with the instant disclosure, a method that employs electrical feedback from a drive axis servo motor to eliminate the need for the sensors and breakaway devices, is surprisingly found. Using the servo motor electrical feedback for this function reduces cost and improves reliability. The present invention also applies electrical feedback from the servo motor to hold a metal swing panel in position during the painting or coating process. A1

In one embodiment, a method for handling a swing metal panel of a vehicle during an automatic coating process on a conveyor system includes the steps of: providing a robot with at least one robot drive axis servo motor and a robot controller, the robot having an arm with a handling tool; monitoring an electrical feedback from the at least one robot drive axis servo motor, the electrical feedback indicative of a torque on the drive axis servo motor; moving the robot to engage the swing metal panel; adapting the movement of at least one of the robot and the handling tool in response to the electrical feedback from the at least one robot drive axis servo motor; and moving the swing metal panel to facilitate the automatic coating process.

In another embodiment, a method for handling a swing metal panel of a vehicle during an automatic coating process on a conveyor system includes the steps of: providing a handling robot with at least one robot drive axis servo motor and a robot controller, the handling robot having an arm with a handling tool; and monitoring an electrical feedback of the at least one robot drive axis servo motor during one of grasping, opening, holding, and closing of the swing metal panel to ensure that the swing metal panel is continuously in the grasp of the handling robot.

In a further embodiment, a system for handling a swing metal panel of a vehicle during an automatic coating process on a conveyor system, includes a handling robot having at least one robot drive axis servo motor and an arm with a handling tool configured to engage the swing metal panel. A robot controller is in electrical communication with the drive axis servo motor and configured to receive electrical feedback from the drive axis servo motor. The electrical feedback is indicative of a torque on the servo motor. The robot controller is configured to adapt the movement of the handling robot in response to the electrical feedback.

DRAWINGS

The above, as well as other advantages of the present invention, will become readily apparent to those skilled in the art from the following detailed description when considered in the light of the accompanying drawings in which.

Figure 4A:
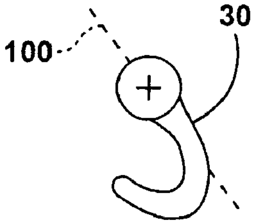
Figure 4B:
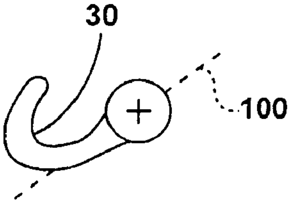
Figure 4C:
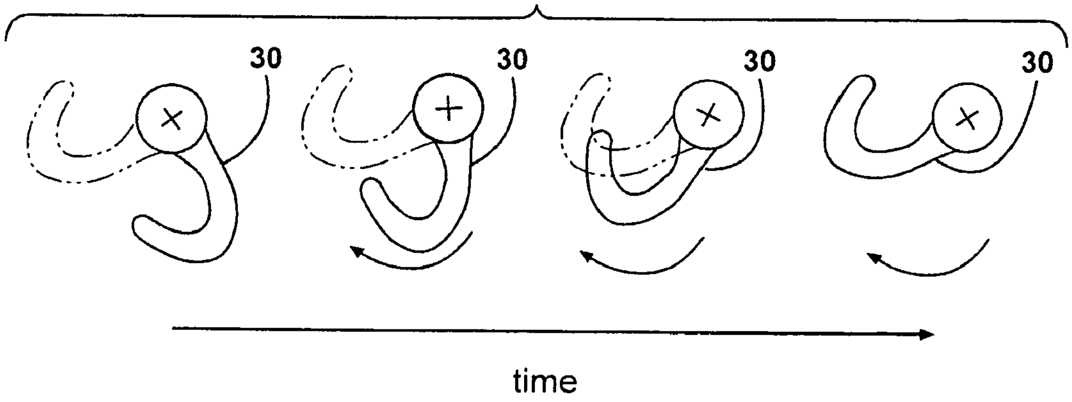

FIGS. 4A-4C further illustrates a method of the present invention in spring mode;

FIGS. 5A-5F illustrates a method of the present invention in lost part detection mode; and FIGS. 6A-6G illustrates a method of the present invention in hood/deck exchange mode.

DETAILED DESCRIPTION OF THE INVENTION

Figure 1:
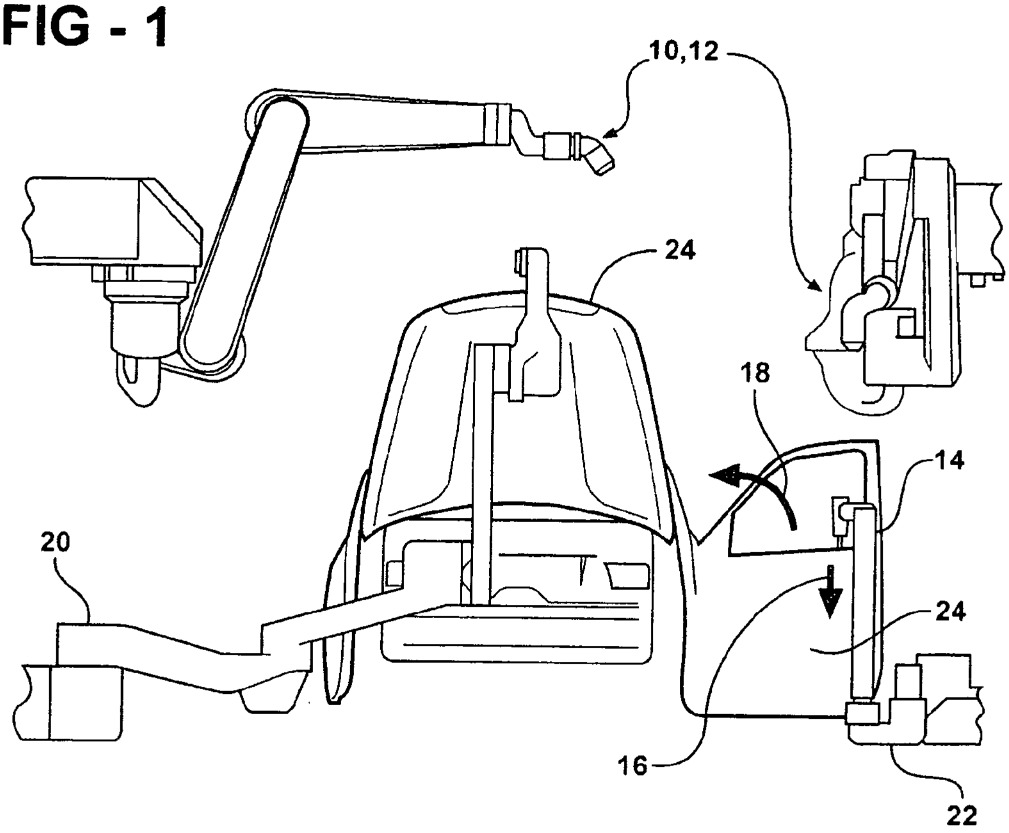
FIG. 1 illustrates a partial, schematic view of a paint spray booth of a first embodiment of the invention.

With reference to FIG. 1, a spray booth is illustrated depicting an arrangement of painting robots 10, 12 and handling robots 20, 22. The handling robots 20, 22 have a robot controller and a robot arm with a handling tool 14, 30. The handling robots 20, 22 assist the painting robots 10, 12 by one of grasping, opening, holding, and closing doors, hoods, deck lids, and/or hatches (referred to herein as swing metal panels 24; 26) to expose an interior compartment of a vehicle 28 so that one of the painting robots 10, 12 can paint the interior surfaces of the vehicle 28 according to an automatic coating process. It should be appreciated that the system- and method of the present disclosure may be employed with the painting robots 10, 12 having the handling tools 14, 30, and therefore capable of acting as both the painting robots 10, 12 and the handling robots 20, 22, as desired. It should be further appreciated that the specific features, herein described with respect to use of the handling robots 20, 22 for door openings, for example, may equally apply to other swing metal panels such as hoods and hatches.

Figure 2:
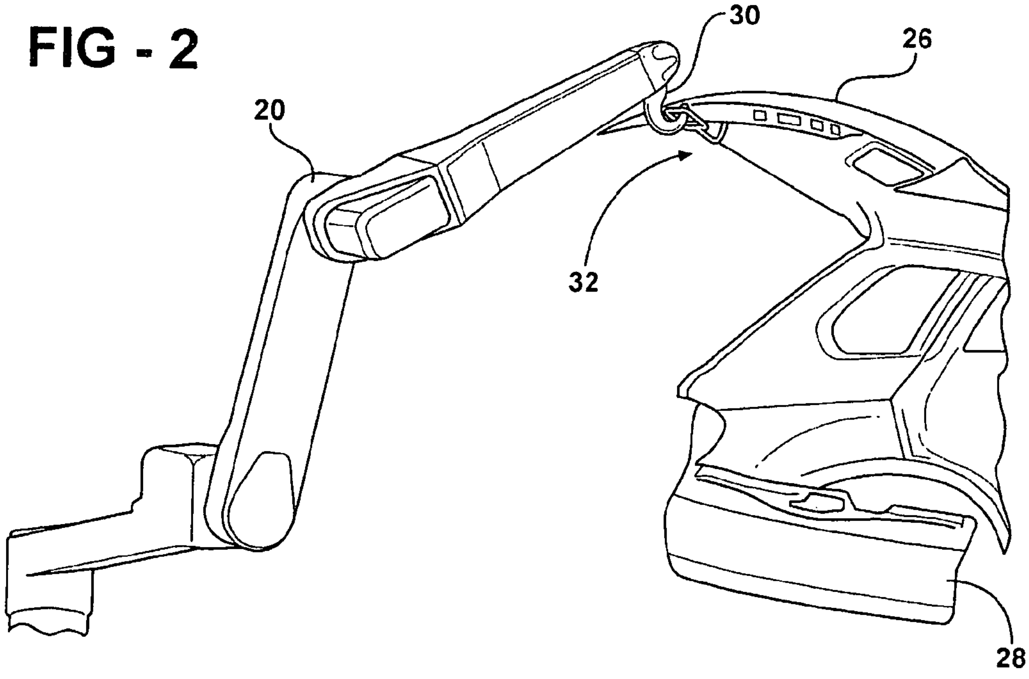
FIG. 2 illustrates a partial, side view of the paint spray booth shown in FIG. 1.

In the embodiments shown in FIGS. 1 and 2, the handling robot 20 is a dedicated hood opening robot and the handling robot 22 is a dedicated door opening robot shown with respective swing metal panels 24, i.e. a hood and a door of the vehicle 28. The handling tool 14 is a door holding tool for holding the swing metal panel 24. The handling tool 14 may be a magnetic tool configured to engage an inner door skin sheet metal or a tool configured to contact a fixture or production aid attached to the swing metal panel 24, for example. In a particular embodiment the handling tooling 14 is a pin tool. The servo motor of the handling robot 22 is configured to monitor an electrical feedback from the drive axis servo motor resulting from the door engagement force 16 and the closing force 18 when the door holding tool 14 is inserted into the vehicle window slot. The electrical feedback is indicative of a torque load on the servo motor of the handling robot 22.

In FIG. 2, the handling robot 20 is a deck lid opening robot and the swing metal panel 26 is a hatch. It should be appreciated that the features described hereinabove with regard to the hood and door opening robots also apply to the deck lid opening robot. The handling robot 20 of FIG. 2 engages the swing metal panel 26 of the vehicle 28. Illustratively, the handling tool 30 is compliant or spring-like and has a desired compliance level sufficient for a torque to be applied to the handling tool 30 with a load. For example, the handling tool 20 is a hook and engages the swing metal panel 26 when the servo motor of the handling robot 20 detects the torque load, such as the hatch engaging force 32, during the movement of the handling robot 20. The torque load may further be indicative of a variation in placement of the swing metal panel 24, 26.

In one embodiment, the system and method according to the present disclosure for handling the swing metal panel 24, 26 during the automatic coating process on a conveyor system, such as a stop station conveyor system or moving line conveyor system, for example, first includes the step of providing the handling robot 20, 22 as described herein. The electrical feedback from the at least one drive axis servo motor is then monitored by the robot controller. The handling robot 20, 22 is moved to engage the swing metal panel 24, 26 and the movement is adapted in response to the electrical feedback from the drive axis servo motor. The interior surfaces of the vehicle 28 are thereby exposed for the painting robots 10, 12 to conduct the automatic coating process.

The preferred embodiments of the present invention use electrical feedback from the handling robot's 20 drive axis servo motor to militate against the need for sensors and breakaway devices. For example, the step of adapting the movement of the handling robot 20, 22 may include halting the movement of the handling robot 20, 22 if the level of the electrical feedback exceeds a predetermined safety threshold. Damage to at least one of the handling robot 20, 22 and the vehicle 28 is thereby militated against.

The system and method according to the present disclosure may employ an up/down linear axis to determine if the handling tool 14 is properly engaging the swing metal panel 24, 26, such as through insertion of a pin tool in a window slot, for example. The method militates against damage to the handling robot 20, 22, the handling tool 14, and the swing metal panel 24, 26 when the swing metal panel 24, 26 is not in a fully closed position, for example, when entering a coating zone. In one example, the handling tool 14 includes a spring with the desired spring compliance in the up/down direction. If the handling tool 14 misses a slot formed in the swing metal panel 24, 26 and hits the top of the swing metal panel 24, 26, for example, while moving to the engagement position, the handling tool 30 reaches the end of the travel position. The handling robot 22 measures a high torque command on the up/down drive axis and stops the downward motion prior to damaging the swing metal panel 24, the handling tooling 14, and the handling robot 22. If the swing metal panel 24 is grossly out of position, the handling tool 14 misses the swing metal panel 24 completely and the handling robot 22 measures a light torque feedback. In either case, the robot controller of the system issues a conveyor "hold" command. The handling robot 22 stops, retreats, and waits for a recovery procedure to be executed by an operator.

In one example according to the present disclosure, the vehicle 28 body enters the spray zone out of position. For example, the vehicle 28 body may not be loaded on the carrier properly or the tracking start position was improperly detected. In these cases, the door opening robot 22 may still have the ability to grasp the vehicle door 24 and open the vehicle door 24 but the door opening robot 22 may open the vehicle door 24 beyond a hinge travel point. In order to prevent damage from opening the vehicle door 24 beyond the hinge travel point, the door opening robot 22 senses the overload condition and initiates a standard hold and recovery procedure.

Swing metal panels 24 on vehicles 28 are often held in place with a spring loaded clip (not shown) to keep the swing metal panels 24 from opening while being conveyed through the paint shop. The clips may have a locking mechanism to fully secure the vehicle doors 24 in place so that the vehicle doors 24 cannot be opened. It should be appreciated that the system according to the present disclosure may further be employed to detect abnormal forces, related to improper position of the swing metal panel 24 in the spring clip, for example, and initiate the hold and recovery procedure.

During a swing metal panel 24, 26 closing procedure, the handling robot 22, 24 must place the swing metal panel 24, 26 into the proper position of the spring clip. If the swing metal panel 24, 26 is not properly positioned in the clip, the swing metal panel 24, 26 can swing open and cause subsequent problems during the exterior painting operation. If the swing metal panel 24, 26 is over-closed or remains too far open, while still partially retained in the clip, for example, further problems may arise with the exterior painting operation. The further problems may include shadowing and excessive film build on the edges of the swing metal panel 24.

It should be further understood when the body of the vehicle 28 is slightly out of position, the handling robot 22 may not put the swing metal panel 24 in the proper position in the clip. During the closing process, the system of the present disclosure can detect the initial contact point where the swing metal panel 24, 26 engages the clip and continue a programmable distance. This allows the handling robots 22, 24 to adjust for placement variation of the swing metal panels 24, 26 and improve on the overall quality and reliability of the automatic coating process.

The use of the handling robots 20, 22 to grasp, open, hold, or close swing metal panels 24, 26, may further include the employment of tooling hooks. Tooling hooks, also referred to as tooling fixtures, provide a large target for the handling robots 20, 22 to grasp. In particular embodiments, the tooling hooks are fixed to the swing metal panel 24, 26 in a place that does not require painting. The tooling hooks are typically attached to the swing metal panel 24, 26 prior to painting and removed at the end of the automatic coating process. The tooling hooks are typically either cleaned for reuse or discarded. Maintaining the tooling hooks is a cost most paint shops prefer to avoid. Therefore, it is desirable to eliminate tooling hooks attached to doors, hoods, hatches and deck lids, for example, to thereby provide a fixtureless operation. The system and method of the present disclosure facilitates the elimination of tooling hooks in relation to automatic painting of swing metal panels 24, 26. The difficulty of conventional fixtureless operation is that the precise position of the vehicle 28 body is often unknown. Robot-to-part synchronization in the direction of conveyor travel can be a cause of the unknown vehicle 28 position.

In the system and method of the present disclosure, the tooling fixture may be eliminated by causing the handling tool 14, 30 of the handling robot 20, 22 to intersect or contact the swing metal panel 24, 26 directly with a force that does not damage the swing metal panel 24, 26 or the handling tool 14, 30. The method of the disclosure includes the step of intersecting the vehicle 28 with the handling tool 14, to determine the position of the vehicle 28 and starting the automatic coating process when the position of the vehicle 28 is determined. A preprogrammed process for moving the handling robot 28 may also be adjusted based on the determined position of the vehicle 28.

As a nonlimiting example, the handling robot 20, 22 can extend the handling tool 24, 26 in front of the body of the vehicle 28 during entry to the painting zone. When the leading edge of the swing metal panel 24, 26 intersects or otherwise touches the handling tool 24, 26, the resulting electrical feedback from the servo motor may be used for fine position location of the swing metal panel 24, 26. Following the step of intersecting the swing metal panel 24, 26, the handling tool 24, 26 can be inserted into a predetermined area of the swing metal panel 24, 26 that does not require painting.

On moving conveyor systems, the conveyor chain or conveyor drive shaft can be provided with a mechanical take-off device and encoders to synchronize the position of the conveyor with the handling robot 20, 22. The system utilizes encoder pulses to provide the handling robot 20, 22 with accurate conveyor positioning and speed. The robot controller may filter the encoder input so that the relative motion of the handling robots 20, 22 is relatively smooth in comparison to the swing metal panels 24, 26 and the vehicle 28 body.

It should be appreciated that when the handling robot 20, 22 opens the swing metal panel 24, 26, a momentary sudden movement of the conveyor can cause the swing metal panel 24, 26 to be lost or cause the handling robot 20, 22 to fault. The system and method of the present disclosure militates against part loss and robot faults by providing compliance between the swing metal panel 24, 26 and the conveyor. The electrical feedback from the servo motor may also be employed as means for detecting part loss.

In a further example, the system and method of the present disclosure may further include sequencing a release mechanism of the handling tool 14, 30 based on the level of electrical feedback from the servo motor. For example, the handling tool 14, 30 may intersect the swing metal panel 24, 26 and, when a predetermined electrical feedback from the servo motor is received, the robot controller may cause the handling tool 14, 30 to release or back off to militate against damage to the handling tool 14, 30 and the swing metal panel 24, 26. In one embodiment, the handling tool 14, 30 is a magnetic tool including a magnetized piston configured to engage an inner door skin sheet metal. The piston of the handling tool 14, 30 may be caused to back off from the sheet metal of the swing metal panel 24, 26 upon receipt of the predetermined level of electrical feedback. The handling tool 14, 30 may also be sequenced to release the swing metal panel 24, 26 entirely following a preprogrammed process that is started at the receipt of the predetermined level of electrical feedback by the robot controller. Other release mechanisms may also be employed, as desired.

With reference to FIGS. 3A-3E, a "soft mode" method according to the present disclosure is shown during normal operation. The soft mode method includes the handling robot 20 and the handling tool 30. The handling tool 30 is preferably servo compliant, i.e., the servo drive axis motor power is adjusted to a level such that the handling tool 30 has a desirable compliance and adjusts to a surge in the moving line conveyor system. In the embodiment shown, the handling tool 30 is a hook and the swing metal panel 24 is a hood. The handling tool 30 is configured to engage the swing metal panel 24.

It should be appreciated that the handling tool 30 has an engagement axis, also known as handling tool axis 100. Preferably, the handling tool axis 100 will be a non-integrated extended axis in the same motion group as the handling robot 20. The method of the disclosure may further include the steps of monitoring the handling tool axis 100 and passing information of the handling tool axis 100 to at least one of another handling robot 20, 22 and the painting robots 10, 12 for coordinating automatic coating process of the vehicle 28. For example, the robot controller may report to at least one of the other handling robots 20, 22 and the painting robots 10, 12 that the swing metal panel 24, 26 is in a desired position so that other painting operations can occur in a pre-programmed sequence.

Figure 3A:
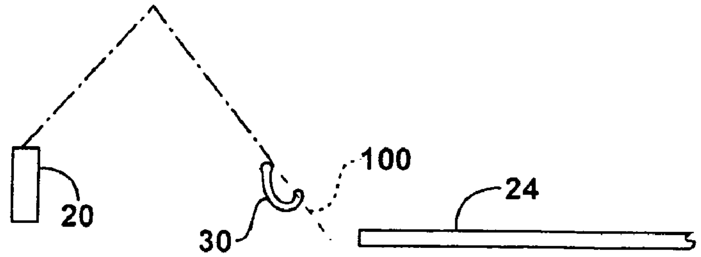
FIGS. 3A-3E illustrates a method of the second embodiment of the present invention.
Figure 3B:
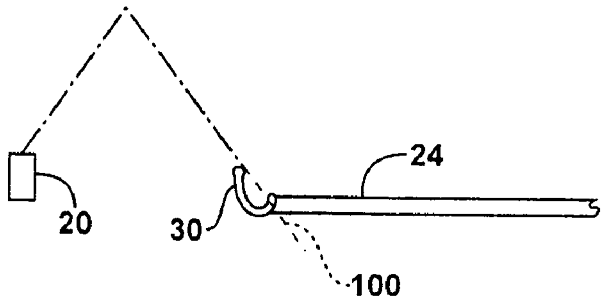
Figure 3C:
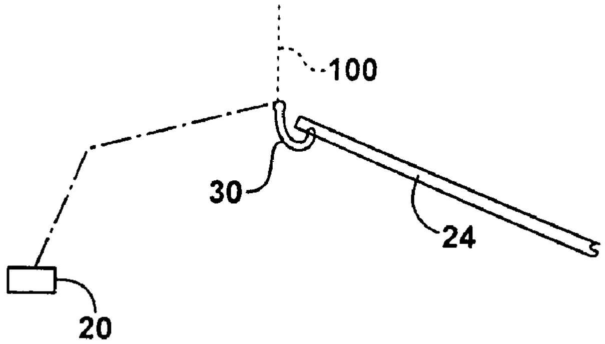
Figure 3D:
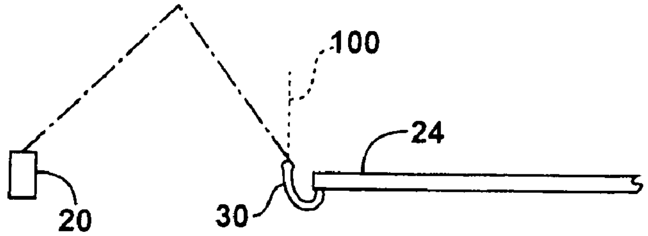
Figure 3E:
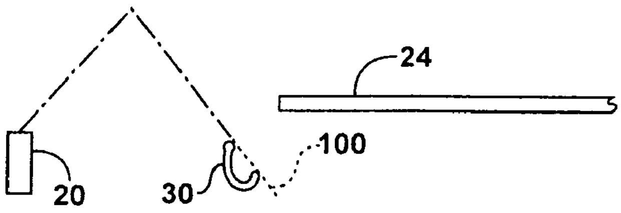

During normal operation, the handling robot 20 approaches the swing metal panel 26 under normal position control (FIG. 3A). When the handling robot 20 intersects or makes contact with the swing metal panel 26, the handling tool axis 100 transitions into soft mode via transaction processing (TP) instructions (FIG. 3B). In soft mode, the handling tool 30 allows for the surge in the conveyor system without damaging the handing tool 30 or the swing metal panel 26. While the handling robot 20 lifts, holds open, and lowers the swing metal panel 26, the soft mode remains active. The handling tool axis 100 may be pushed backward or forward at this time due to the conveyor surge (FIG. 3C). Once the swing metal panel 24 is closed, the handling tool 30 of the handling robot 20 is caused to move away such that the handling tool 30 no longer contacts the swing metal panel 24 (FIG. 3D). When the handling robot 20 has reached the point at which the handling robot 20 is no longer in contact with the swing metal panel 24, the handling tool axis 100 exits soft mode via TP instruction (FIG. 3E).

With reference to FIGS. 4A-4C, a "spring mode" method is illustrated, also known as a "soft float" method. In spring mode operation, the handling tool axis 100 performs as a spring and is compliant to undesirable "jerky" motions of the swing metal panel 24. FIG. 4A illustrates the position control mode having rigid servo control of the handling tool 30 before enabling spring mode. When spring mode is enabled, the handling tool axis 100 will attempt to move to a neutral orientation (FIG. 4B), also known as the "lost part position". As the handling tool axis 100 moves to the lost part position, if the robot controller detects a sufficient load the handling tool 30 will "float" at the location. This floating will provide for any movement of the swing metal panel 24 to be compensated by the handling tool axis 100 while maintaining positive contact between the handling tool 30 and the swing metal panel 24. When, spring mode is activated, the handling tool 30 "springs" towards neutral position. Eventually, if no torque load is detected on the servo motor, the handling tool axis 100 will obtain the neutral position (FIG. 4C).

Figure 5A:
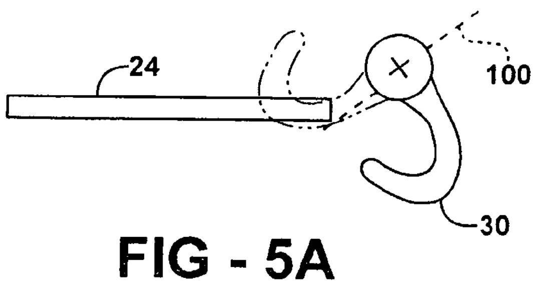
Figure 5B:
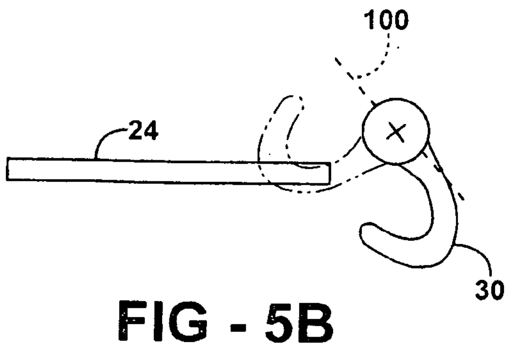
Figure 5C:
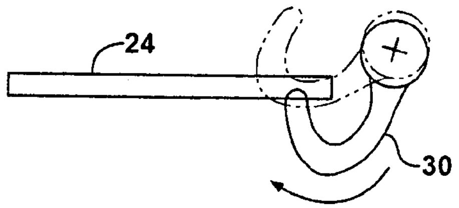
Figure 5D:
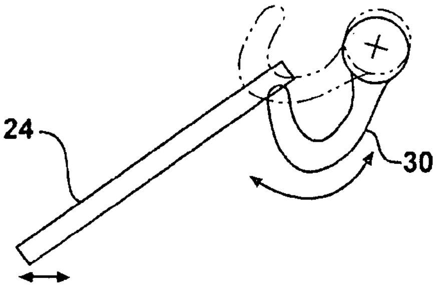
Figure 5E:
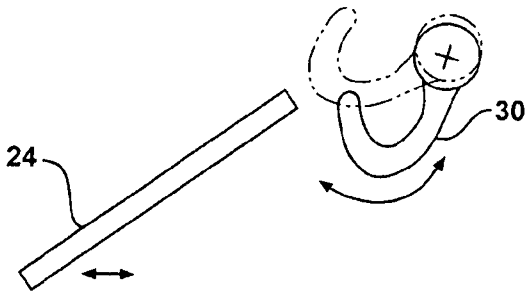
Figure 5F:
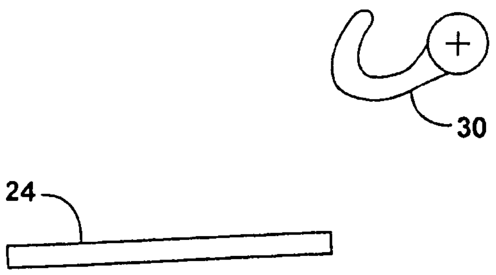

With reference to FIGS. 5A-5F, a "lost part detection" method is shown that does not require the use of electrical/mechanical sensors. Using position feedback from the servo motor controlling the handling tool axis 100 of the handling tool 30, the presence and position of the swing metal panel 24 may be determined. The determination of the position of the swing metal panel 24 is performed while the handling tool axis 100 is in the spring mode. When in the spring mode, the handling tool axis 100 will attempt to move to the lost part (neutral) position as shown by the dashed lines in FIG. 5A. If the handling tool axis 100 obtains the neutral position and the handling tool 30 was instead expected to be holding the swing metal panel 24, an alarm is posted alerting the operator of the condition. The following steps are illustrated for the lost part detection mode: FIG. 5B illustrates a pickup step where spring mode for the handling tool axis 100 is active and a find part timer is reset. FIG. 5C illustrates the pickup step where spring mode remains active and the handling tool 30 makes contact with a part (such as the swing metal panel 24). Upon an expiration of the find part timer, if the handling tool axis 100 is not in lost part position (as shown in FIG. 5F), then an assumption is made that the swing metal panel 24 is found. FIG. 5D illustrates the swing metal panel 24 held by handling tool 30 with spring mode still active. With spring mode active, the handling tool 30 is able to be compliant and adjust for undesirable, e.g., jerky, movement of the swing metal panel 24. FIG. 5E illustrates the swing metal panel 24 being lost from the handling tool 30 engagement, thereby allowing the handling tool 30 to rotate about the handling tool axis 100 to the lost part orientation. FIG. 5F illustrates the hook 30 obtaining lost part orientation to thereby trigger the alarm.

The hood, trunk or deck lid parts can also be detected in the open position by observing the torque feedback of one more servo motors affected by the weight of the parts. The loaded versus non-loaded torque is reflected to any of the serial linkages providing a lifting component. Due to the gravity load, the servo motor torque feedback in the holding position can be compared to the non-loaded torque feedback. The process sequence can continue or be interrupted based on comparing the two values.

FIGS. 6A-6G illustrate a "hood/deck exchange" method. The hood/deck exchange method includes the step of monitoring the electrical feedback of the at least one robot drive axis servo motor during one of grasping, opening, holding, and closing the swing metal panel 24 to ensure that the swing metal panel is continuously in the grasp of the handling robot 20, 22. The robot controller then reports to another handling robot 20, 22 or the painting robots 10, 12 that the swing metal panel 24 is a desired position so that a "hand off" may occur and further painting operations can occur in a pre-programmed sequence. In conventional work cells, multiple handling robots 20, 22 are required to exchange the responsibility of holding the swing metal panel 24 as to prevent paint overspray and access to areas of the swing metal panel 24. The hood/deck exchange operation can take place with handling robots 20, 22 used with vehicles 28 on stationary or moving conveyors. In the present method, the handling robot 20 which is to receive the swing metal panel 24 moves to a pre-contact orientation under position control. The robot controller switches the handling robot 20 to spring mode and verifies positive contact with the swing metal panel 24.

Figure 6A:
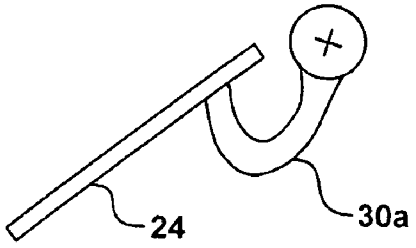
Figure 6B:
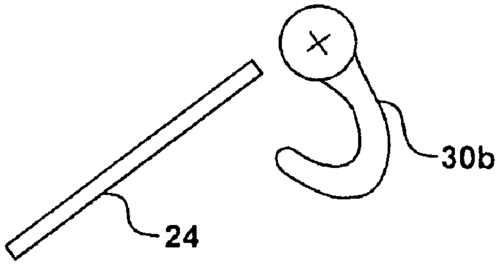
Figure 6C:
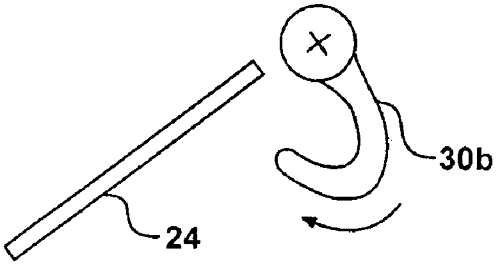
Figure 6D:
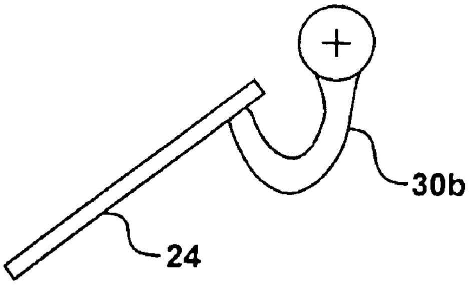

Referring to a nonlimiting example in FIG. 6A, the first handling robot 20 with the handling tool 30*a* intersects or lightly touches the swing metal panel 24. Spring mode is active during the intersection. Simultaneously, and with reference to FIG. 6B, the second handling robot 22 with the handling tool 30*b* is disposed in a pre-contact orientation to the swing metal panel 24. The handling tool 30*b* is placed in position active mode. In FIG. 6C, the second handling tool 30*b* is caused to make contact with the swing metal panel 24. Spring mode is then activated. In FIG. 6D, the handling tool 30*b* intersects or otherwise makes contact with the swing metal panel 24 while the spring mode is active. Once intersection occurs, the first handling robot 20 with the handling tool 30*a* is released from responsibility of holding the swing metal panel 24 in position.

Figure 6E:
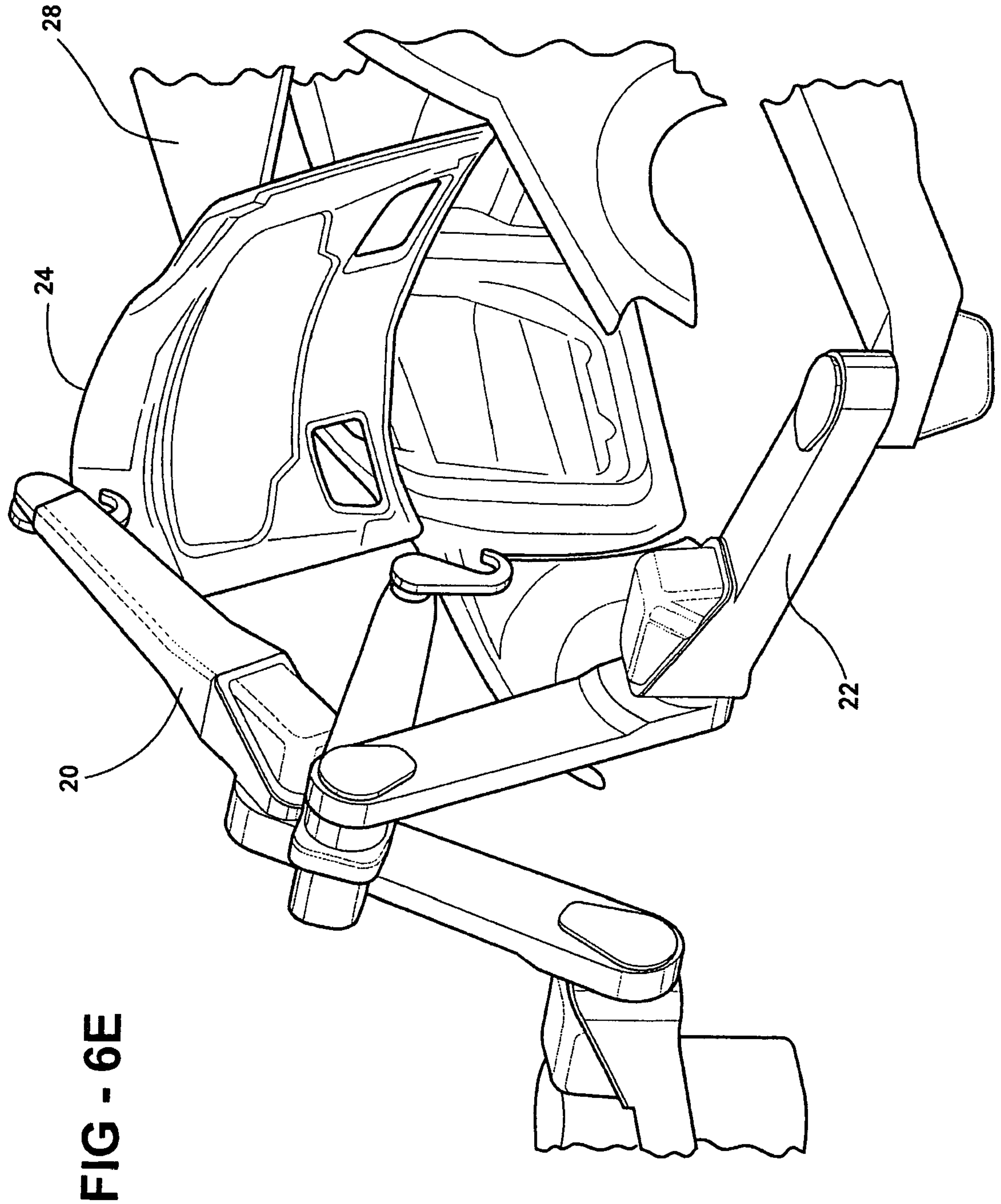
Figure 6F:
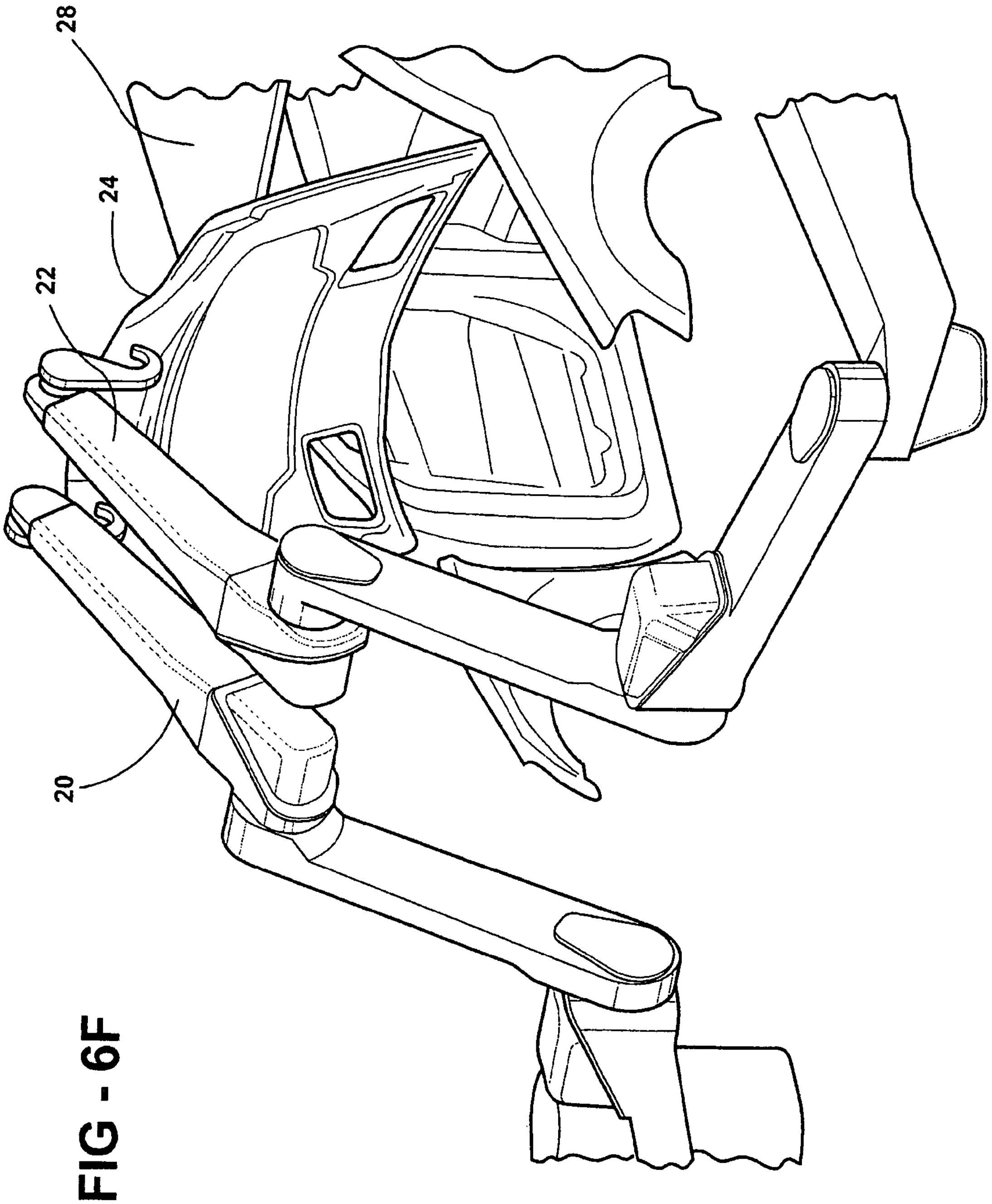
Figure 6G:
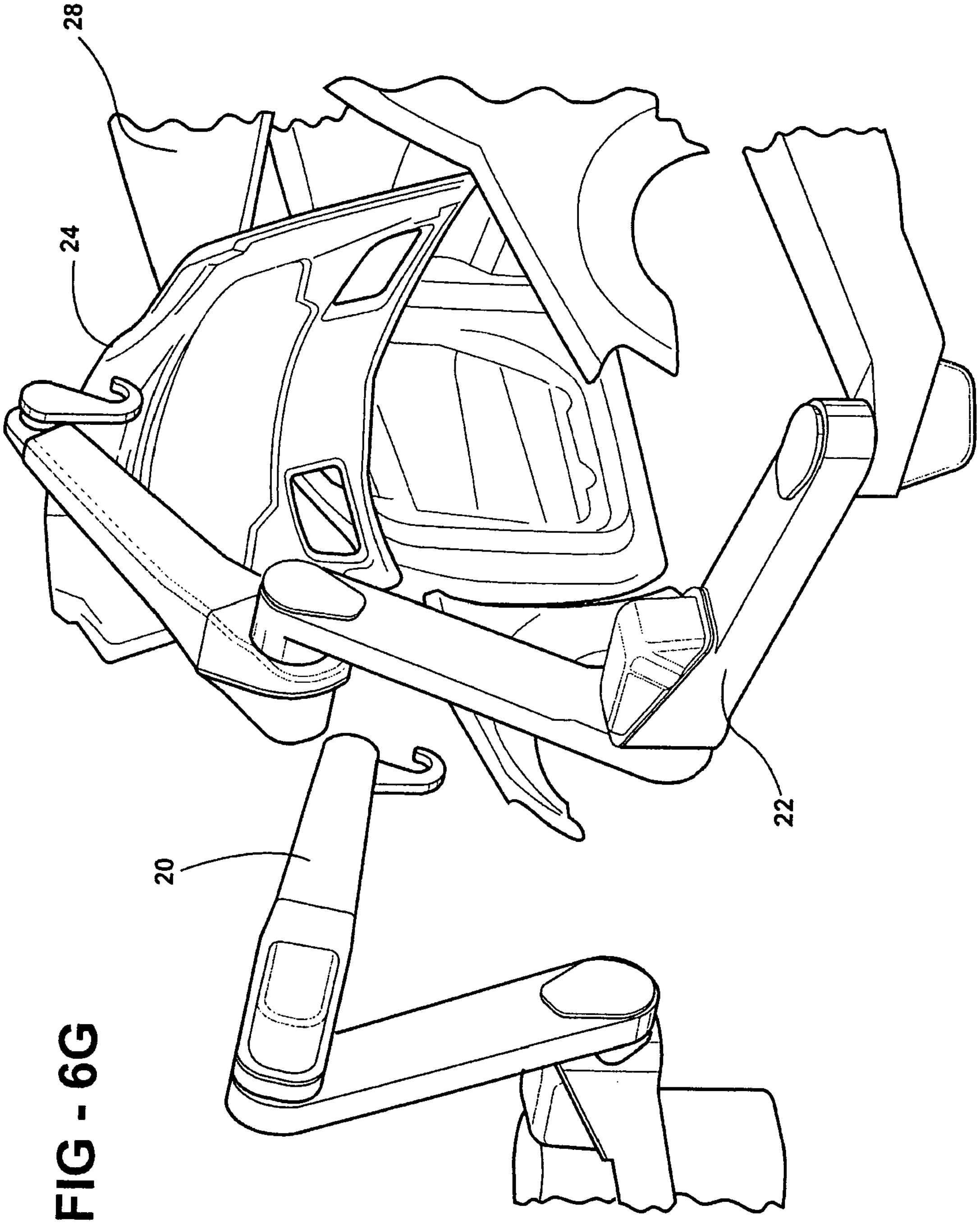

The "hood/deck exchange" method sequence may first include the painting robots 10, 12 avoiding the area in the grasp of the first handling robot 20 as shown in FIG. 6E. In FIG. 6F, the second handling robot 22 moves to grasp the swing metal panel 24 in an area already painted by one of the painting robots 10, 12. While approaching the grasping position, the second handling robot 22 observes the encoder position of the first handling robot 20 and adjusts the tooling position to grasp the swing metal panel 24 in the correct position. As shown in FIG. 6G, the first handling robot 22 is then released from its responsibility to engage the swing metal panel 24.

It is surprisingly found that using servo motor feedback advantageously eliminates the need for sensors and breakaways when engaging the swing metal panel 24, 26 by at least one of grasping, opening, holding, and closing during the automatic painting operation. The present invention eliminates the use of electromechanical sensors and components, thereby eliminating custom parts for each vehicle and militating against damage to the vehicle 28, the handling robots 20, 22, and the handling tools 14, 30.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for handling a swing metal panel of a vehicle during an automatic coating process on a conveyor system, the method comprising the steps of:

providing a robot with at least one robot drive axis servo motor and a robot controller, the robot having an arm with a handling tool;

monitoring an electrical feedback from the at least one robot drive axis servo motor, the electrical feedback indicative of a torque on the drive axis servo motor;

moving the robot to engage the swing metal panel;

adapting the movement of at least one of the robot and the handling tool in response to the electrical feedback from the at least one robot drive axis servo motor; and moving the swing metal panel to facilitate the automatic coating process.

2. The method of claim 1, wherein the robot engages the swing metal panel by at least one of grasping, opening, holding, and closing the swing metal panel.

3. The method of claim 1, wherein the torque is indicative of a variation in placement of the swing metal panel.

4. The method of claim 1, wherein the swing metal panel has a fixture that is engaged by the handling tool.

5. The method of claim 1, wherein the step of adapting the movement of the robot includes halting the movement of the robot if the level of the electrical feedback exceeds a predetermined safety threshold so that at least one of the robot and the vehicle are not damaged.

6. The method of claim 1, further comprising the step of: wherein the step of adapting the movement of the handling tool includes sequencing a release mechanism of the handling tool based on the level of the electrical feedback.

7. The method of claim 1, further comprising the step of: adjusting the servo drive axis motor power to a level such that the tool becomes compliant and adjusts to a surge in the moving line conveyor system.

8. The method of claim 1, further comprising the step of: intersecting the vehicle with the handling tool to determine the position of the vehicle.

9. The method of claim 8, further comprising the step of: starting the automatic coating process when the position of the vehicle is determined.

10. The method of claim 8, further comprising the step of: wherein the step of adapting the movement of the robot includes adjusting a pre-programmed process for moving the robot based on the position of the vehicle determined.

11. The method of claim 1, further comprising the steps of: monitoring an engagement axis of the handling tool and the swing metal panel; and passing information on the engagement axis to another robot for coordinating automatic coating process of the vehicle.

12. A method for handling a swing metal panel of a vehicle during an automatic coating process on a conveyor system, the method comprising the steps of:

providing a handling robot with at least one robot drive axis servo motor and a robot controller, the handling robot having an arm with a handling tool; and monitoring an electrical feedback of the at least one robot drive axis servo motor during one of grasping, opening, holding, and closing of the swing metal panel to ensure that the swing metal panel is continuously in the grasp of the handling robot.

13. The method of claim 12, further comprising the step of: reporting by the robot controller to at least one of another handling robot and a painting robot that the swing metal panel is in a desired position so that other painting operations can occur in a pre-programmed sequence.

14. A system for handling a swing metal panel of a vehicle during an automatic coating process on a conveyor system, comprising;

a handling robot having at least one robot drive axis servo motor and an arm with a handling tool configured to engage the swing metal panel;

a robot controller in electrical communication with the drive axis servo motor and configured to receive electrical feedback from the drive axis servo motor indicative of a torque on the servo motor, the robot controller configured to adapting the movement of the handling robot in response to the electrical feedback.

15. The system of claim 14, wherein the handling tool has a desired compliance.

16. The system of claim 15, wherein the servo motor has a drive power adjusted to a level to cause the handling tool to have the desire compliance.

17. The system of claim 15, wherein the handling tool includes a spring configured to provide the desired compliance.

18. The system of claim 14, wherein the handling tool is a pin tool configured for insertion into a slot formed in the swing metal panel of the vehicle.

19. The system of claim 18, wherein the slot is a window slot and the swing metal panel is a door panel of the vehicle.

20. The system of claim 14, wherein the handling tool is a hook configured to engage one of a hood and a hatch of the vehicle.

* * * * *